(12) United States Patent
Okuno et al.

(10) Patent No.: US 10,811,696 B2
(45) Date of Patent: Oct. 20, 2020

(54) POROUS METAL BODY, FUEL BATTERY, AND METHOD FOR PRODUCING POROUS METAL BODY

(71) Applicant: SUMITOMO ELECTRIC INDUSTRIES, LTD., Osaka-shi, Osaka (JP)

(72) Inventors: Kazuki Okuno, Itami (JP); Takahiro Higashino, Itami (JP); Masatoshi Majima, Itami (JP); Tomoyuki Awazu, Itami (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 352 days.

(21) Appl. No.: 15/750,650

(22) PCT Filed: Jul. 28, 2016

(86) PCT No.: PCT/JP2016/072166
§ 371 (c)(1),
(2) Date: Feb. 6, 2018

(87) PCT Pub. No.: WO2017/026291
PCT Pub. Date: Feb. 16, 2017

(65) Prior Publication Data
US 2020/0099063 A1     Mar. 26, 2020

(30) Foreign Application Priority Data

Aug. 7, 2015  (JP) ................................. 2015-156677
Jan. 28, 2016  (JP) ................................. 2016-014147

(51) Int. Cl.
*H01M 4/86*     (2006.01)
*H01M 8/0232*   (2016.01)
(Continued)

(52) U.S. Cl.
CPC ............. *H01M 8/0232* (2013.01); *B22F 7/08* (2013.01); *C25D 1/08* (2013.01); *H01M 4/74* (2013.01);
(Continued)

(58) Field of Classification Search
None
See application file for complete search history.

(56) References Cited

U.S. PATENT DOCUMENTS

2016/0130678 A1   5/2016  Okuno et al.
2017/0117557 A1   4/2017  Okuno et al.

FOREIGN PATENT DOCUMENTS

EP   1 255 316 A2    11/2002
JP   S55-165501 A    12/1980
(Continued)

*Primary Examiner* — Jonathan Crepeau
(74) *Attorney, Agent, or Firm* — Faegre Drinker Biddle & Reath LLP

(57) ABSTRACT

A porous metal body including a skeleton having a three-dimensional mesh-like structure, the porous metal body having a plate-like overall shape. The skeleton has a hollow structure and includes a primary metal layer and at least one of a first microporous layer and a second microporous layer. The primary metal layer is composed of nickel or a nickel alloy. The first microporous layer contains nickel and chromium and is disposed on the outer peripheral surface of the primary metal layer. The second microporous layer contains nickel and chromium and is disposed on the inner peripheral surface of the primary metal layer, the inner peripheral surface facing the hollow space of the skeleton.

4 Claims, 3 Drawing Sheets

(51) Int. Cl.

*C25D 1/08*     (2006.01)
    *C23C 28/02*    (2006.01)
    *B22F 7/08*     (2006.01)
    *H01M 4/74*     (2006.01)
    *C22C 1/04*     (2006.01)

(52) U.S. Cl.
    CPC ......... H01M 4/8605 (2013.01); *C22C 1/0433* (2013.01); *C23C 28/021* (2013.01)

(56) References Cited

FOREIGN PATENT DOCUMENTS

| | | |
|---|---|---|
| JP | H11-154517 A | 6/1999 |
| JP | 2012-132083 A | 7/2012 |
| JP | 2012-149282 A | 8/2012 |
| JP | 2015-004088 A | 1/2015 |
| WO | WO 2014/203594 A1 | 12/2014 |
| WO | WO-2015/151828 A1 | 10/2015 |

POROUS METAL BODY, FUEL BATTERY, AND METHOD FOR PRODUCING POROUS METAL BODY

TECHNICAL FIELD

The present invention relates to a porous metal body, a fuel battery, and a method for producing a porous metal body.

The present application claims a priority to Japanese Patent Application No. 2015-156677 filed on Aug. 7, 2015 and Japanese Patent Application No. 2016-014147 filed on Jan. 28, 2016, which are incorporated herein by reference in their entirety.

BACKGROUND ART

One of the commonly known methods for producing a porous metal body having a high porosity and a large surface area is to form a metal layer on the surface of a porous resin body, such as resin foam. For example, in the method for producing a porous metal body described in Japanese Unexamined Patent Application Publication No. 11-154517 (PTL 1), a porous resin body is subjected to an electrical conduction treatment in which a metal-coating layer is formed on the porous resin body by electroplating. The porous resin body is removed by incineration as needed.

Japanese Unexamined Patent Application Publication No. 2012-132083 (PTL 2) proposes a porous metal body composed of a nickel-tin alloy which has resistance to oxidation and corrosion and a high porosity and is suitably used as a current collector included in a battery, a capacitor, a fuel battery, or the like. Japanese Unexamined Patent Application Publication No. 2012-149282 (PTL 3) proposes a porous metal body composed of a nickel-chromium alloy which has high corrosion resistance.

The above porous metal bodies have been widely used as, for example, an active-material-supporting body constituting a nickel electrode included in a nickel-cadmium battery or a nickel-hydrogen battery. In the case where the porous metal body is used as a component of a second battery as described above, the porosity of the porous metal body is set to be high, that is, about 95%, such that the porous metal body is bonded to an active material with high adhesion in order to increase the capacity density of the battery.

CITATION LIST

Patent Literature

PTL 1: Japanese Unexamined Patent Application Publication No. 11-154517
PTL 2: Japanese Unexamined Patent Application Publication No. 2012-132083
PTL 3: Japanese Unexamined Patent Application Publication No. 2012-149282

SUMMARY OF INVENTION

Solution to Problem

A porous metal body according to an embodiment of the present invention is a porous metal body including a skeleton having a three-dimensional mesh-like structure, the porous metal body having a plate-like overall shape, the skeleton having a hollow structure, the skeleton including a primary metal layer and at least one of a first microporous layer and a second microporous layer, the primary metal layer being composed of nickel or a nickel alloy, the first microporous layer containing nickel and chromium, the first microporous layer being disposed on an outer peripheral surface of the primary metal layer, the second microporous layer containing nickel and chromium, the second microporous layer being disposed on an inner peripheral surface of the primary metal layer, the inner peripheral surface facing a hollow space of the skeleton.

DESCRIPTION OF EMBODIMENTS

Technical Problem

Figure 1:
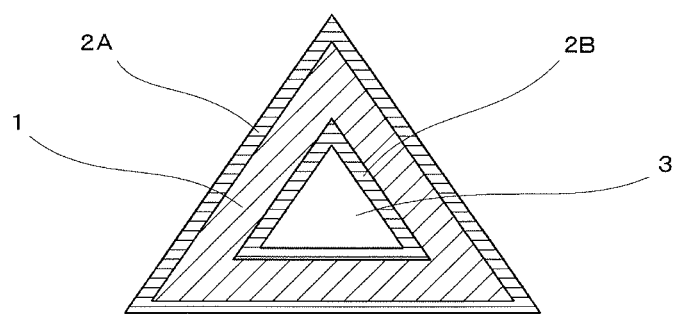
FIG. 1 is a schematic cross-sectional view of the skeleton of an example of a porous metal body according to an embodiment of the present invention.

There has been an increasing demand for batteries, capacitors, fuel batteries, and the like having a higher output capacity and a higher battery capacity (smaller size).

Gas diffusion layers included in fuel batteries are commonly carbon structures or stainless steel (SUS) structures. A carbon structure and an SUS structure have grooves formed therein which serve as gas channels. The grooves have a width of about 500 and are communicated with one another in the form of a continuous line. The grooves are formed in about ½ the surface of a carbon structure or an SUS structure at which the structure comes into contact with an electrolyte. Therefore, the gas diffusion layers have a porosity of about 50%.

The above gas diffusion layers do not have a markedly high porosity and cause a large pressure loss. Thus, it has been not possible to increase the output capacity of a fuel battery while reducing the size of the fuel battery.

Accordingly, the inventors of the present invention studied a method in which a porous metal body including a skeleton having a three-dimensional mesh-like structure is used as a gas diffusion layer of a fuel battery, instead of a carbon structure or an SUS structure.

In the case where the porous metal body is used as a gas diffusion layer of, for example, a polymer electrolyte fuel cell (PEFC), the porous metal body needs to have high corrosion resistance. This is because, if water containing ions eluted from the porous metal body is brought into contact with an ion-exchange membrane included in a membrane-electrode assembly (MEA) of a PEFC, the water may reduce the water-holding capacity of the ion-exchange membrane and, consequently, significantly degrade the function of the ion-exchange membrane as an electrolyte.

The corrosion resistance of a porous metal body composed of nickel can be effectively enhanced by alloying nickel. It was found that, in particular, a nickel-chromium alloy having a chromium content of about 20% by mass or more and 50% by mass or less has the highest corrosion resistance compared with nickel or various types of stainless steel.

An example of the methods for alloying a porous metal body composed of nickel with chromium is a chromizing treatment in which chromium is diffused and permeated into a nickel film. One of the proposed industrial methods is a powder-packing method in which a porous metal body composed of nickel is packed with a permeation material that is a mixture of a chromium powder, a halide, and an alumina powder and subsequently heated in a reducing atmosphere. Other examples of the methods for alloying a porous metal body composed of nickel with chromium include the following: a method in which, when the porous metal body composed of nickel is produced by plating, chromium oxide is added to a conductant agent used for making the surface of the skeleton of a resin shaped body, which serves as a base, conductive; and a method in which, when the porous metal body composed of nickel is produced by plating, a chromium-coating layer is formed in addition to a nickel-coating layer.

In the case where the powder-packing method is used, it is necessary to put the porous metal body into a predetermined container in order to pack the porous metal body with a permeation material. This makes it not possible to continuously produce an extra-long porous metal body and disadvantageously increases the production costs. In the case where plating is used as described above, it is difficult to deposit chromium uniformly on a skeleton having a complex shape since the existing chromium plating technique has high rectilinearity and, when plural skeletons are stacked on one another in the thickness direction as in the porous metal body used in the present invention, it is not possible to deposit chromium on the rear surfaces of the skeletons which cannot be seen from the surface. Therefore, it is difficult to foam a nickel-chromium alloy layer over the entire surface of the skeleton by plating; nickel may expose at the surface of the skeleton.

In light of the above-described issues, an object of the present invention is to provide a porous metal body including a skeleton having a surface in which nickel is alloyed with chromium, the porous metal body having high corrosion resistance against sulfuric acid and the like and high oxidation resistance in a high-temperature oxidizing atmosphere and capable of being produced continuously.

Advantageous Effects of Invention

According to the present invention, it is possible to provide a porous metal body including a skeleton having a surface in which nickel is alloyed with chromium, the porous metal body having high corrosion resistance against sulfuric acid and the like and capable of being produced continuously.

DESCRIPTION OF EMBODIMENTS OF THE PRESENT INVENTION

First, embodiments of the present invention are described below.

(1) A porous metal body according to an embodiment of the present invention is a porous metal body including a skeleton having a three-dimensional mesh-like structure, the porous metal body having a plate-like overall shape, the skeleton having a hollow structure, the skeleton including a primary metal layer and at least one of a first microporous layer and a second microporous layer, the primary metal layer being composed of nickel or a nickel alloy, the first microporous layer containing nickel and chromium, the first microporous layer being disposed on an outer peripheral surface of the primary metal layer, the second microporous layer containing nickel and chromium, the second microporous layer being disposed on an inner peripheral surface of the primary metal layer, the inner peripheral surface facing a hollow space of the skeleton.

Hereinafter, "porous metal body including a skeleton having a three-dimensional mesh-like structure" may be referred to simply as "porous metal body".

The porous metal body described in (1) above has high corrosion resistance since nickel is alloyed with chromium in a suitable manner at least in the surface of the skeleton of the porous metal body and is preferably used as a gas diffusion layer of a fuel battery. Furthermore, the porous metal body can be continuously produced. This enables the porous metal body to be provided at a lower cost than the nickel-chromium porous bodies known in the related art.

In addition, the porous metal body described in (1) includes a microporous layer formed in the surface of the skeleton and has a considerably large surface area. Therefore, using the porous metal body as a gas diffusion layer of a fuel battery further enhances the gas diffusibility.

(2) A porous metal body according to an embodiment of the present invention is the porous metal body described in (1) above, wherein the skeleton includes the primary metal layer, the first microporous layer, and the second microporous layer.

The porous metal body described in (2) above has markedly high corrosion resistance since a microporous layer containing nickel and chromium is deposited also on the inside of the skeleton.

(3) A porous metal body according to an embodiment of the present invention is the porous metal body described in (1) or (2) above, wherein the content of chromium in the porous metal body is 20% by mass or more and 50% by mass or less.

The porous metal body described in (3) above has further high corrosion resistance.

(4) A porous metal body according to an embodiment of the present invention is the porous metal body described in any one of (1) to (3) above, wherein the overall shape of the porous metal body has a thickness of 0.2 mm or more and 1.2 mm or less.

Since the porous metal body described in (4) above has a small thickness, using the porous metal body as a gas diffusion layer of a fuel battery reduces the size of the fuel battery and increases the output capacity of the fuel battery per unit volume.

(5) A porous metal body according to an embodiment of the present invention is the porous metal body described in any one of (1) to (4) above, wherein the porous metal body has a porosity of 51% or more and 90% or less and a metal-coating weight of 200 g/m$^2$ or more and 1200 g/m$^2$ or less.

Since the porous metal body described in (5) above has a sufficiently high porosity, using the porous metal body as a gas diffusion layer of a fuel battery increases the output capacity of the fuel battery.

(6) A fuel battery according to an embodiment of the present invention is a fuel battery including the porous metal body according to any one of (1) to (5) above, the porous metal body serving as a gas diffusion layer.

The fuel battery described in (6) above is a fuel battery having a small size and a high output capacity, that is, a high power generation capacity per unit volume.

(7) A method for producing a porous metal body according to an embodiment of the present invention is a method for producing the porous metal body described in (1) above, the method including:

a conductive layer-formation step in which a resin shaped body having a resin skeleton having a three-dimensional mesh-like structure, the resin shaped body having a plate-like overall shape, is prepared, and a conductive layer is formed on a surface of the resin skeleton of the resin shaped body;

a primary metal layer-formation step in which a primary metal layer is formed on the conductive layer, the primary metal layer being composed of nickel or a nickel alloy;

a powder layer-formation step in which a powder layer is formed on the outer peripheral surface of the primary metal layer, the powder layer containing a nickel powder, a powder of chromium or a chromium oxide, and a binder;

a removal step in which the resin shaped body is removed; and a heat treatment step in which a powder-layer-deposited porous body is heated in a reducing atmosphere, the powder-layer-deposited porous body including the primary metal layer and the powder layer disposed on the outer peripheral surface of the primary metal layer, such that the powder layer is sintered to form a first microporous layer.

The porous metal body described in (1) above can be produced by the method for producing a porous metal body described in (7) above.

(8) A method for producing a porous metal body according to an embodiment of the present invention is the method for producing a porous metal body described in (7) above, wherein the powder layer-formation step includes:

a substep in which a first slurry is applied onto the outer peripheral surface of the primary metal layer, the first slurry containing a nickel powder, a powder of chromium or a chromium oxide, and a binder; and a substep in which the first slurry deposited on the outer peripheral surface of the primary metal layer is dried.

(9) A method for producing a porous metal body according to an embodiment of the present invention is the method for producing a porous metal body described in (7) above, wherein the powder layer-formation step includes:

a substep in which a second slurry is applied onto the outer peripheral surface of the primary metal layer, the second slurry containing a nickel powder and a binder;

a substep in which the second slurry deposited on the outer peripheral surface of the primary metal layer is dried;

a substep in which a third slurry is applied onto a surface of the second slurry deposited on the outer peripheral surface of the primary metal layer, the third slurry containing a powder of chromium or a chromium oxide, and a binder; and a substep in which the third slurry deposited on the surface of the second slurry is dried.

Note that, the method for producing a porous metal body described in (9) above may be a method in which the third slurry is applied onto the surface of the second slurry before the second slurry deposited on the outer surface of the primary metal layer becomes completely dried but after at least the surface of the second slurry has become solidified and the second slurry and third slurry are dried subsequently.

(10) A method for producing a porous metal body according to an embodiment of the present invention is the method for producing a porous metal body described in (7) above, wherein the powder layer-formation step includes:

a substep in which a first slurry is applied onto the outer peripheral surface of the primary metal layer, the first slurry containing a nickel powder, a powder of chromium or a chromium oxide, and a binder;

a substep in which the first slurry deposited on the outer peripheral surface of the primary metal layer is dried;

a substep in which a third slurry is applied onto a surface of the first slurry deposited on the outer peripheral surface of the primary metal layer, the third slurry containing a powder of chromium or a chromium oxide, and a binder; and a substep in which the third slurry deposited on the surface of the first slurry is dried.

Note that, the method for producing a porous metal body described in (10) above may be a method in which the third slurry is applied onto the surface of the first slurry before the first slurry deposited on the outer surface of the primary metal layer becomes completely dried but after at least the surface of the first slurry has become solidified and the first slurry and third slurry are dried subsequently.

The methods for producing a porous metal body described in (8) to (10) above facilitate the diffusion of chromium into nickel and make it easy to produce a porous metal body containing an alloy of nickel with chromium.

(11) A method for producing a porous metal body according to an embodiment of the present invention is a method for producing the porous metal body described in (1) above, the method including:

a conductive layer-formation step in which a resin shaped body having a resin skeleton having a three-dimensional mesh-like structure, the resin shaped body having a plate-like overall shape, is prepared, and a conductive layer is formed on a surface of the resin skeleton of the resin shaped body, the conductive layer containing a nickel powder, a powder of chromium or a chromium oxide, and a binder;

a primary metal layer-formation step in which a primary metal layer is formed on the conductive layer, the primary metal layer being composed of nickel or a nickel alloy;

a removal step in which the resin shaped body is removed; and a heat treatment step in which a conductive-layer-deposited porous body is heated in a reducing atmosphere, the conductive-layer-deposited porous body including the primary metal layer and the conductive layer disposed on the inner peripheral surface of the primary metal layer, such that the conductive layer is sintered to form a second microporous layer.

(12) A method for producing a porous metal body according to an embodiment of the present invention is the method for producing a porous metal body described in any one of (7) to (11) above, wherein the conductive layer-formation step includes:

a substep in which a first slurry is applied onto the surface of the resin skeleton of the resin shaped body, the first slurry containing a nickel powder, a powder of chromium or a chromium oxide, and a binder; and a substep in which the first slurry deposited on the surface of the resin skeleton of the resin shaped body is dried, and wherein the conductive layer formed in the conductive layer-formation step is sintered in the heat treatment step to form a second microporous layer.

(13) A method for producing a porous metal body according to an embodiment of the present invention is the method for producing a porous metal body described in any one of (7) to (11) above, wherein the conductive layer-formation step includes:

a substep in which a third slurry is applied onto the surface of the resin skeleton of the resin shaped body, the third slurry containing a powder of chromium or a chromium oxide and a binder;

a substep in which the third slurry deposited on the surface of the resin skeleton of the resin shaped body is dried;

a substep in which a second slurry is applied onto a surface of the third slurry deposited on the surface of the resin skeleton of the resin shaped body, the second slurry containing a nickel powder and a binder; and a substep in which the second slurry deposited on the surface of the third slurry is dried, and wherein the conductive layer formed in the conductive layer-formation step is sintered in the heat treatment step to form a second microporous layer.

Note that, the method for producing a porous metal body described in (13) above may be a method in which the second slurry is applied onto the surface of the third slurry before the third slurry deposited on the surface of the resin skeleton of the resin shaped body becomes completely dried but after at least the surface of the third slurry has become solidified and the third slurry and second slurry are dried subsequently.

(14) A method for producing a porous metal body according to an embodiment of the present invention is the method for producing a porous metal body described in any one of (7) to (11) above, wherein the conductive layer-formation step includes:

a substep in which a third slurry is applied onto the surface of the resin skeleton of the resin shaped body, the third slurry containing a powder of chromium or a chromium oxide and a binder;

a substep in which the third slurry deposited on the surface of the resin skeleton of the resin shaped body is dried;

a substep in which a first slurry is applied onto a surface of the third slurry deposited on the surface of the resin skeleton of the resin shaped body, the first slurry containing a nickel powder, a powder of chromium or a chromium oxide, and a binder; and a substep in which the first slurry deposited on the surface of the third slurry is dried, and wherein the conductive layer formed in the conductive layer-formation step is sintered in the heat treatment step to form a second microporous layer.

Note that, the method for producing a porous metal body described in (14) above may be a method in which the first slurry is applied onto the surface of the third slurry before the third slurry deposited on the surface of the resin skeleton of the resin shaped body becomes completely dried but after at least the surface of the third slurry has become solidified and the third slurry and first slurry are dried subsequently.

The methods for producing a porous metal body described in (11) to (14) above enable the production of a porous metal body in which nickel is alloyed with chromium in a suitable manner also in the inner surface of the skeleton of the porous metal body.

(15) A method for producing a porous metal body according to an embodiment of the present invention is the method for producing a porous metal body described in any one of (7) to (14) above, the method including a thickness adjustment step in which the porous metal body is rolled such that the thickness of the overall shape of the porous metal body is adjusted to be 0.2 mm or more and 1.2 mm or less, the thickness adjustment step being conducted subsequent to the heat treatment step.

The porous metal body described in (4) above can be produced by the method for producing a porous metal body described in (15) above. Using the method for producing a porous metal body described in (15) above also increases the uniformity in the thickness of the porous metal body and reduces the surface irregularities of the porous metal body.

(16) A method for producing a porous metal body according to an embodiment of the present invention is the method for producing a porous metal body described in any one of (7) to (15) above, wherein the nickel powder is a carbonyl nickel powder.

(17) A method for producing a porous metal body according to an embodiment of the present invention is the method for producing a porous metal body described in any one of (7) to (16) above, wherein the nickel powder has an apparent specific gravity of 0.4 g/cm$^3$ or more and 1.2 g/cm$^3$ or less.

A porous metal body including a skeleton having a large surface area can be produced by the methods for producing a porous metal body described in (16) or (17) above.

(18) A method for producing a porous metal body according to an embodiment of the present invention is the method for producing a porous metal body described in any one of (7) to (17) above, wherein the binder is a polyolefin, an acrylic resin, or polyvinyl alcohol.

Using the method for producing a porous metal body described in (18) above increases ease of handling of the first to third slurries and facilitates the powder layer-formation step and the conductive layer-formation step.

Details of Embodiments of the Present Invention

Specific examples of the porous metal body, etc. according to embodiments of the present invention are described below. It is intended that the scope of the present invention be not limited by the following examples, but determined by the appended claims, and include all variations of the equivalent meanings and ranges to the claims.

<Porous Metal Body>

FIG. 1 is a schematic cross-sectional view of the skeleton of an example of a porous metal body according to an embodiment of the present invention.

The porous metal body according to an embodiment of the present invention includes a skeleton having a three-dimensional mesh-like structure and has a plate-like overall shape. The skeleton has a hollow structure and includes a primary metal layer 1 and at least one of a first microporous layer 2A and a second microporous layer 2B. The primary metal layer 1 is composed of nickel or a nickel alloy. The first microporous layer 2A contains nickel and chromium and is disposed on the outer peripheral surface of the primary metal layer 1. The second microporous layer 2B contains nickel and chromium and is disposed on the inner peripheral surface of the primary metal layer 1 which faces a hollow space (a hollow portion 3) of the skeleton.

While the primary metal layer 1 is a dense metal layer, the first microporous layer 2A and the second microporous layer 2B are porous layers having pores formed therein which is formed by sintering metal microparticles. Therefore, the porous metal body according to an embodiment of the present invention is a porous metal body having a considerably large surface area.

The porous metal body according to an embodiment of the present invention may include a skeleton constituted by the primary metal layer 1 and the first microporous layer 2A, a skeleton constituted by the primary metal layer 1 and the second microporous layer 2B, or a skeleton constituted by the primary metal layer 1, the first microporous layer 2A, and the second microporous layer 2B. The first microporous layer 2A and the second microporous layer 2B, which contain nickel and chromium, have high corrosion resistance. Accordingly, the porous metal body including a skeleton including the first microporous layer 2A or the second microporous layer 2B disposed on the surface has high corrosion resistance. The porous metal body also has high resistance to hot water, water vapor, and oxidation.

As described below, a method for producing a porous metal body composed primarily of nickel has been established. The porous metal body according to an embodiment of the present invention can be produced by improving such a production method. Therefore, when the metal constituting the porous metal body is nickel or a nickel alloy, the porous metal body can be continuously produced by a simple method that is a modification of the methods for producing a porous metal body which are known in the related art.

The nickel alloy constituting the porous metal body is not limited. Examples of the nickel alloy include an alloy of nickel with tin, chromium, aluminum, titanium, copper, cobalt, tungsten, iron, manganese, silver, gold, phosphorus, or boron. The nickel alloy preferably has higher corrosion resistance against sulfuric acid and the like than nickel.

The porous metal body according to an embodiment of the present invention may intentionally or inevitably contain a component other than nickel or the nickel alloy which does not form an alloy with nickel.

The porous metal body according to an embodiment of the present invention, which includes a skeleton having a three-dimensional mesh-like structure, is a porous metal body having a considerably large surface area. Thus, using the porous metal body as, for example, a gas diffusion layer of a fuel battery enhances gas feed-discharge capability and gas diffusibility.

That is, the porous metal body can be used instead of grooves formed in the separators of the fuel batteries known in the related art. Since the porous metal body has high corrosion resistance against sulfuric acid and the like, the porous metal body can be suitably used also as a gas diffusion layer disposed on the oxygen-electrode side of a PEFC.

The porous metal body according to an embodiment of the present invention preferably includes the primary metal layer 1, the first microporous layer 2A, and the second microporous layer 2B as illustrated in FIG. 1. In such a case, the porous metal body has high corrosion resistance even on the inside surface of the skeleton.

The content of chromium in the porous metal body is preferably 20% by mass or more and 50% by mass or less. Setting the content of chromium in the porous metal body to 20% by mass or more enhances the corrosion resistance of the porous metal body to a sufficiently high level. Setting the content of chromium in the porous metal body to 50% by mass or less limits a reduction in the conductivity of the porous metal body. From the above viewpoints, the content of chromium in the porous metal body is more preferably 25% by mass or more and 45% by mass or less and is further preferably 25% by mass or more and 40% by mass or less.

The thickness of the overall shape of the porous metal body according to an embodiment of the present invention is preferably 0.2 mm or more and 1.2 mm or less. Since the porous metal body according to an embodiment of the present invention, which contains chromium, is harder than the porous nickel bodies known in the related art, the porous metal body according to an embodiment of the present invention can be rolled to a thickness of about 0.2 mm when the porous metal body has a thickness of, for example, about 1 mm. When the thickness of the overall shape of the porous metal body is about 0.2 mm, using the porous metal body as a gas diffusion layer of a fuel battery reduces the volume of the gas diffusion layer and, consequently, makes it possible to produce a small fuel battery having a high output capacity. Using a gas diffusion layer having an excessively large thickness increases the likelihood of a fuel gas fed into the cell passing through the gas diffusion layer and discharged outside the cell without reaching the electrode. Accordingly, the thickness of the overall shape of the porous metal body is preferably about 1.2 mm or less. From the above viewpoints, the thickness of the porous metal body is more preferably 0.3 mm or more and 1.1 mm or less and is further preferably 0.3 mm or more and 1.0 mm or less.

The porosity of the porous metal body according to an embodiment of the present invention is preferably 51% or more and 90% or less. Porous metal bodies composed of nickel have been used primarily as a current collector included in a nickel cadmium battery or a nickel hydrogen battery and, in such a case, the porosity of the porous metal body is set to 95%, which is considerably high, in order to increase the amount of active material packed in the porous metal body. In contrast, in the case where the porous metal body according to an embodiment of the present invention is used as a gas diffusion layer of a fuel battery, setting the porosity of the porous metal body not to be excessively high enhances the gas diffusibility. Considering that the gas diffusion layers included in the fuel batteries known in the related art have a porosity of about 50%, setting the porosity of the porous metal body to about 51% or more enables a reduction in the pressure loss of a gas and improvement in gas diffusibility to be both achieved. From the above viewpoints, the porosity of the porous metal body according to an embodiment of the present invention is more preferably 55% or more and 88% or less and is further preferably 60% or more and 85% or less.

The weight of metal coating deposited on the porous metal body according to an embodiment of the present invention is preferably 200 g/m$^2$ or more and 1200 g/m$^2$ or less. Setting the weight of metal coating deposited on the porous metal body to 200 g/m$^2$ or more increases ease of handling of the porous metal body, such as the mechanical strength of the porous metal body. Setting the weight of metal coating deposited on the porous metal body to 1200 g/m$^2$ or less limits increases in the production costs and the weight of the porous metal body. From the above viewpoints, the weight of metal coating deposited on the porous metal body is more preferably 300 g/m$^2$ or more and 1100 g/m$^2$ or less and is further preferably 400 g/m$^2$ or more and 1000 g/m$^2$ or less.

The size of pores formed in the plate-like porous metal body according to an embodiment of the present invention as viewed from overhead is preferably 100 μm or more and 700 μm or less. Setting the pore size to 100 μm or more reduces the loss in the pressure of a fuel gas. Setting the pore size to 700 μm or less increases the gas diffusibility and the efficiency with which a fuel is fed into an electrode. From the above viewpoints, the size of pores formed in the porous metal body is more preferably 150 μm or more and 650 μm or less and is further preferably 200 μm or more and 600 μm or less.

The average pore size is determined from the inverse of the number of cells formed in the porous metal body. The number of the cells is determined by counting the number of cells which are exposed at the topmost surface of the porous metal body and intersect a one-inch line drawn on the surface of the porous metal body. The number of the cells is expressed in cell/inch. Note that 1 inch is equal to 2.54 centimeters.

<Fuel Battery>

A fuel battery according to an embodiment of the present invention is a fuel battery that includes the porous metal body according to the above embodiment of the present invention which serves as a gas diffusion layer. The type of the fuel battery is not limited; the fuel battery may be either a PEFC or a solid oxide fuel cell.

Hereinafter, a PEFC is described as an example of the fuel battery.

The ion-exchange membrane, etc. included in the PEFC may be those known in the related art.

For example, the membrane electrode assembly, which includes an ion-exchange membrane and a catalyst layer joined to each other, may be a commercial one. Such a commercial membrane electrode assembly may be used directly. The anode and the cathode are gas diffusion electrodes that each include a platinum catalyst supported thereon at about 0.5 mg/cm$^2$. The above components are integrated into one piece with an ion-exchange membrane that is Nafion (registered trademark) 112.

Figure 2:
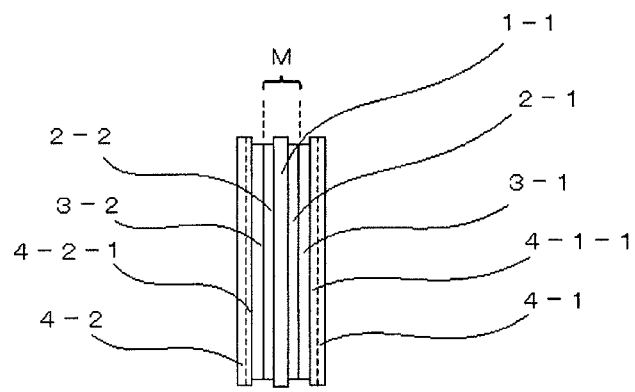
FIG. 2 is a schematic diagram illustrating an example of an electric cell constituting a fuel battery according to an embodiment of the present invention.

FIG. 2 is a schematic cross-sectional view of an electric cell included in the PEFC.

In FIG. 2, a membrane electrode assembly (MEA) M includes an ion-exchange membrane 1-1 and gas diffusion electrodes disposed on the respective surfaces of the ion-exchange membrane 1-1, that is, active carbon layers (2-1 and 2-2) that contain a platinum catalyst. One of the active carbon layers is a hydrogen electrode that serves as an anode, and the other is an air electrode that serves as a cathode. In FIG. 2, current collectors (3-1 and 3-2) serve as current collectors and gas diffusion layers of the respective electrodes and may be composed of, for example, commercial water-repellent carbon paper. The carbon paper may be, for example, water-repellent carbon paper having a porosity of about 50% and a fluororesin content of about 15%.

In FIG. 2, separators (4-1 and 4-2) may be, for example, commercial graphite plates. Gas diffusion layers (4-1-1 and 4-2-1) are the porous metal bodies according to the above-described embodiment of the present invention and serve also as gas feed-discharge channels. Since the porous metal body according to the above-described embodiment of the present invention has a considerably smaller thickness than the porous metal bodies known in the related art, it is possible to reduce the size of the fuel battery.

Although FIG. 2 illustrates an electric cell, fuel batteries in practical use include plural cells stacked on top of one another with a separator interposed between each pair of adjacent cells in order to achieve a desired voltage. The cells are typically connected in series and arranged such that the cathode of a cell faces the anode of another cell adjacent to the cell across a separator. The electric cells are integrated into one piece by being pressed using bolts, nuts, and the like attached to the periphery of the multilayer body.

<Method for Producing Porous Metal Body>

The porous metal body according to an embodiment of the present invention may be produced by various methods. Examples of the production method include the methods described in (7) to (18) above.

The steps of the method for producing a porous metal body are described in detail below.

—Conductive Layer-Formation Step—

A conductive layer-formation step is a step in which a resin shaped body having a three-dimensional mesh-like structure and a plate-like overall shape is prepared, and a conductive layer is formed on a surface of the resin skeleton of the resin shaped body.

(Resin Shaped Body Having Three-Dimensional Mesh-Like Structure)

The plate-like resin shaped body having a three-dimensional mesh-like structure which is used as a base may be any porous resin shaped body that is publicly known or commercially available. Examples of such a resin shaped body include a foam, nonwoven fabric, felt, and woven fabric that are made of a resin. The above resin shaped bodies may be used in combination with one another as needed. The material for the resin shaped body is not limited but is preferably a material that can be removed by incineration subsequent to deposition of a metal on the resin shaped body. The resin shaped body is preferably composed of a flexible material, because a stiff sheet-like resin shaped body is particularly likely to be bent while the resin shaped body is in service.

The resin shaped body is preferably composed of a resin foam. Examples of the resin foam include a urethane resin foam, a styrene resin foam, and a melamine resin foam. In particular, a urethane resin foam is preferable, because it has a particularly high porosity.

The porosity of the resin shaped body is generally, but not limited to, about 50% or more and 97% or less and is preferably about 80% or more and 96% or less. The thickness of the resin shaped body is not limited and may be set appropriately depending on the application of the porous metal body. The thickness of the resin shaped body is generally set to about 600 μm or more and 5000 μm or less and is preferably set to about 800 μm or more and 2000 μm or less. If the thickness of the resin shaped body is 500 μm or less, the plate-like shape of the resin shaped body may become deformed because the resin shaped body has a considerably high porosity.

In general, when the porous metal body is rolled such that the thickness thereof is reduced to half, the porosity of the porous metal body is also reduced to half. Accordingly, in the case where the thickness adjustment step described below is conducted in the production of the porous metal body, it is preferable to use, as a base, a resin shaped body having a thickness about 1.3 to 2 times the desired thickness of the porous metal body.

Figure 3:
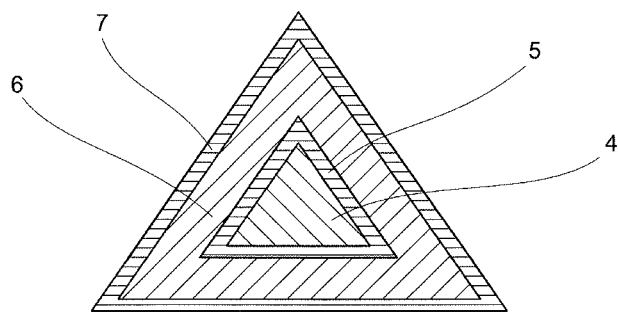
FIG. 3 is a schematic cross-sectional view of the skeleton of an example of a resin structure prepared in a method for producing a porous metal body according to an embodiment of the present invention.

Hereinafter, an example case where a resin foam is used as a resin shaped body having a three-dimensional mesh-like structure is described with reference to FIG. 3. FIG. 3 is a schematic cross-sectional view of the skeleton of a resin structure prepared by a method for producing a porous metal body according to an embodiment of the present invention in which a conductive layer is formed on the surface of the resin skeleton of the resin shaped body, a nickel-coating layer is formed on the conductive layer, and a powder layer is formed on the nickel-coating layer.

(Formation of Conductive Layer)

A conductive layer 5 is formed on the surface of the resin skeleton of the resin shaped body 4. This makes the surface of the resin skeleton of the resin shaped body 4 conductive and enables nickel electroplating to be performed in the primary metal layer-formation step described below. The conductive layer 5 is not limited and may be any layer having conductivity. Examples of a material constituting the conductive layer 5 include metals, such as nickel, tin, chromium, copper, iron, tungsten, titanium, and stainless steel, and powders of carbon, such as a carbon powder.

Specifically, preferable examples of the method for forming the conductive layer 5 include application of a conductive paint prepared by adding a binder to a powder of a metal, such as nickel, tin, or chromium, or a graphite powder; electroless plating; sputtering; and gas-phase treatments, such as vapor deposition and ion plating.

Electroless nickel plating may be performed by, for example, immersing a resin shaped body 4 in a publicly known electroless nickel plating bath, such as an aqueous nickel sulfate solution containing sodium hypophosphite serving as a reductant. Before being immersed in the plating bath, the resin shaped body 4 may optionally be immersed in an activation liquid (cleaning liquid produced by Japan Kanigen Co., Ltd.) that contains a trace amount of palladium ions.

Sputtering of nickel or chromium may be performed by, for example, attaching the resin shaped body 4 to a substrate holder and subsequently applying a direct voltage between the holder and the target (nickel or chromium) while introducing an inert gas. Ionized particles of the inert gas are brought into collision with nickel or chromium, and particles of nickel or chromium blown off by the inert gas are deposited on the surface of the resin skeleton of the resin shaped body 4.

Although the structure of the conductive layer 5 is not limited as described above, the conductive layer 5 is preferably formed by any one of the methods (I) to (III) below.

(I) Application of First Slurry

The method (I) is a method for forming the conductive layer 5, the method including:

a step in which a first slurry is applied onto the surface of the resin skeleton of the resin shaped body 4; and a step in which the first slurry deposited on the surface of the resin skeleton of the resin shaped body is dried.

The first slurry may be any slurry that contains a nickel powder, a powder of chromium or a chromium oxide, and a binder.

In the method (I), a power of chromium or chromium oxide is mixed with a nickel powder. This increases the likelihood of a chromium component derived from the power of chromium or chromium oxide being diffused into the primary metal layer 6 formed in the primary metal layer-formation step, which is described below, while a nickel component derived from the nickel powder is diffused into the primary metal layer 6 by the heat treatment. In addition, a mixture of the nickel powder and the powder of chromium or a chromium oxide is sintered to form a second microporous layer 2B in the heat-treatment step described below. This enhances the corrosion resistance of the surface of the hollow portion formed inside the skeleton of the porous metal body, that is, the inner peripheral surface of the primary metal layer 6.

(II) Application of Third Slurry and Second Slurry

The method (II) is a method for forming the conductive layer 5, the method including:

a step in which a third slurry is applied onto the surface of the resin skeleton of the resin shaped body 4;

a step in which the third slurry deposited on the surface of the resin skeleton of the resin shaped body 4 is dried;

a step in which a second slurry is applied onto the surface of the third slurry deposited on the surface of the resin skeleton of the resin shaped body 4; and a step in which the second slurry deposited on the surface of the third slurry is dried.

The third slurry may be any slurry that contains a powder of chromium or a chromium oxide and a binder. The second slurry may be any slurry that contains a nickel powder and a binder.

In the method (II), the third slurry and the second slurry are applied onto the surface of the resin skeleton of the resin shaped body 4 in this order to form a conductive layer and, subsequent to the primary metal layer-formation step described below, a layer containing the powder of chromium or a chromium oxide, a layer containing the nickel powder, and the primary metal layer 6 are formed in this order on and above the surface of the resin skeleton of the resin shaped body 4. In other words, the nickel powder is present in the vicinity of the primary metal layer 6.

This increases the likelihood of the chromium component derived from the powder of chromium or a chromium oxide being diffused into the primary metal layer 6 while the nickel component derived from the nickel powder is diffused into the primary metal layer 6 in the heat treatment step. Furthermore, in the method (II), a microporous layer that is a layer containing a large amount of powder of chromium or a chromium oxide is formed on the side far from the primary metal layer 6. This further enhances the corrosion resistance of the surface of the hollow portion formed inside the skeleton of the porous metal body that is to be formed finally.

The method (II), in which the second slurry and the third slurry each contain only one metal, is a method suitable for the industrial continuous production of the porous metal body, because the slurries can be prepared without taking, for example, the specific gravities of the slurries into account.

(III) Application of Third Slurry and First Slurry

The method (III) is a method for forming the conductive layer 5, the method including:

a step in which a third slurry is applied onto the surface of the resin skeleton of the resin shaped body 4;

a step in which the third slurry deposited on the surface of the resin skeleton of the resin shaped body 4 is dried;

a step in which a first slurry is applied onto the surface of the third slurry deposited on the surface of the resin skeleton of the resin shaped body 4; and a step in which the first slurry deposited on the surface of the third slurry is dried.

In the method (III), the third slurry and the first slurry are applied onto the surface of the resin skeleton of the resin shaped body 4 in this order to form the conductive layer 5 and, subsequent to the primary metal layer-formation step described below, a layer containing the powder of chromium or a chromium oxide, a layer containing the nickel powder and the powder of chromium or a chromium oxide, and the primary metal layer 6 are formed in this order on and above the surface of the resin skeleton of the resin shaped body 4. Also in the method (III), this increases the likelihood of the chromium component derived from the powder of chromium or a chromium oxide being diffused into the primary metal layer 6 while the nickel component derived from the nickel powder is diffused into the primary metal layer 6 in the heat treatment step. Furthermore, in the method (III), a microporous layer that is a layer containing a large amount of powder of chromium or a chromium oxide is formed on the side far from the primary metal layer 6. This further enhances the corrosion resistance of the surface of the hollow portion formed inside the skeleton of the porous metal body that is to be formed finally.

(Nickel Powder)

Examples of the nickel powder included in the first and second slurries include a carbonyl nickel powder, a mechanically pulverized nickel powder, an electrolytic nickel powder, and a reduced nickel powder. In particular, a carbonyl nickel powder is preferable because particles of a carbonyl nickel powder have a spiked (konpeito-like) shape with deep cleavages and an irregular surface and enable the formation of a microporous layer having a further large surface area. The following two commercial carbonyl nickel powders have been widely used: a carbonyl nickel powder having a particle size of 3.0 μm or more and 7.0 μm or less and an apparent density (bulk specific gravity) of 1.6 g/cm$^3$ or more and 2.6 g/cm$^3$ or less; and a carbonyl nickel powder having a particle size of 2.2 μm or more and 2.8 μm or less and an apparent density of 0.50 g/cm$^3$ or more and 0.65 g/cm$^3$ or less. The above two carbonyl nickel powders have a specific gravity smaller than the absolute specific gravity of nickel. In particular, the specific gravity of the latter carbonyl nickel powder is far smaller than the absolute specific gravity of nickel. This enables a microporous layer having a high porosity to be formed in the heat treatment step described below.

The apparent specific gravity of the nickel powder is preferably 0.4 g/cm$^3$ or more and 1.2 g/cm$^3$ or less, although the preferable apparent specific gravity of the nickel powder varies with, for example, the mixing ratio between the nickel powder and the powder of chromium or a chromium oxide.

Setting the apparent specific gravity of the nickel powder to 0.4 g/cm$^3$ or more prevents an excessive increase in the viscosities of the slurries and makes it easy to apply the slurries to the porous body. Setting the apparent specific gravity of the nickel powder to 1.2 g/cm$^3$ or less enables a microporous layer having a high porosity to be formed as described above. From the above viewpoints, the apparent specific gravity of the nickel powder is more preferably 0.4 g/cm$^3$ or more and 1.0 g/cm$^3$ or less and is further preferably 0.45 g/cm$^3$ or more and 0.8 g/cm$^3$ or less.

The particle size of the nickel powder is preferably 0.1 μm or more and 10 μm or less.

Setting the particle size of the nickel powder to 0.1 μm or more prevents an excessive increase in the viscosities of the slurries and makes it easy to apply the slurries to the resin skeleton of the resin shaped body. Setting the particle size of the nickel powder to 10 μm or less makes it possible to deposit the nickel powder densely on the surface of the resin skeleton of the resin shaped body. From the above viewpoints, the particle size of the nickel powder is more preferably 0.3 μm or more and 9 μm or less and is further preferably 0.5 μm or more and 8 μm or less.

(Powder of Chromium or Chromium Oxide)

The powder of chromium or a chromium oxide which is included in the first and second slurries is preferably, for example, a commercial chromium oxide powder that has been pulverized to an adequate particle size.

The particle size of the powder of chromium or a chromium oxide is preferably 0.1 μm or more and 10 μm or less. Setting the particle size of the powder of chromium or a chromium oxide to 0.1 μm or more prevents an excessive increase in the viscosities of the slurries and makes it easy to apply the slurries to the resin skeleton of the resin shaped body. Setting the particle size of the powder of chromium or a chromium oxide to 10 μm or less makes it possible to deposit the powder of chromium or a chromium oxide densely on the surface of the resin skeleton of the resin shaped body. From the above viewpoints, the particle size of the nickel powder of chromium or a chromium is preferably 0.3 μm or more and 9 μm or less and is further preferably 0.5 μm or more and 8 μm or less.

(Binder)

The binder included in the first to third slurries is not limited and may be any binder with which the above metal powders can be dispersed to faun a paste.

Preferable examples of the binder include a polyolefin, an acrylic resin, and polyvinyl alcohol, that is, more specifically, polyolefins, such as polyethylene and polypropylene, copolymers of an olefin with vinyl acetate or styrene, styrene-acrylic acid ester, a polymethacrylic acid ester copolymer, and polyvinyl alcohol. When the above resins are used as a binder, the binder is advantageously used in the form of an aqueous solution or an aqueous emulsion because water is suitably used as a solvent of the above resins.

It is preferable to add a thickener, such as carboxymethyl cellulose (CMC), to the first to third slurries in order to form a paste-like slurry that can be readily applied onto the surface of the resin skeleton of the resin shaped body.

A carbon powder and the like may be added to the slurries in order to increase the conductivities of the slurries. The carbon powder may be a powder of carbon black, active carbon, graphite, or the like. The material for the carbon powder is not limited. Carbon black may be used in order to achieve uniform conductivity. A graphite fine powder may be used in the case where the strength of the conductive coating layer is to be considered. The above carbon powders may be mixed with active carbon.

The above slurries are applied to the surface of the resin skeleton of the resin shaped body and subsequently dried. Thus, the surface of the resin skeleton of the resin shaped body can be made conductive.

—Primary Metal Layer-Formation Step—

In this step, the primary metal layer 6 is formed on the surface of the conductive layer 5 prepared above (see FIG. 3).

Hereinafter, a method for forming the primary metal layer 6 by nickel plating is described.

(Formation of Nickel-Coating Layer)

Either electroless nickel plating or nickel electroplating may be used for forming the nickel-coating layer. It is preferable to use nickel electroplating since nickel electroplating achieves high efficiency. Nickel electroplating may be performed in accordance with a conventional method. The plating bath used for nickel electroplating may be a publicly known or commercially available one, such as a Watts bath, a chlorination bath, or a sulfamic acid bath.

The resin shaped body including the conductive layer disposed on the surface thereof, which is formed by electroless plating or sputtering as described above, is immersed in the plating bath. After the resin shaped body has been connected to the cathode and the nickel counter electrode plate has been connected to the anode, a direct current or a pulsed intermittent current is applied in order to form a nickel-coating layer on the conductive layer.

The coating weight of the nickel-electroplating layer is adjusted such that the nickel content in the final composition of the porous metal body is 50% by mass or more.

The weight of nickel coating included in the porous metal body is preferably about 200 g/m$^2$ or more and 600 g/m$^2$ or less. In the case where the porous metal body contains other metal components, that is, the porous metal body is composed of a nickel alloy, the total weight of metal coating is preferably about 200 g/m$^2$ or more and 1200 g/m$^2$ or less.

(Circulation of Plating Solution During Plating)

In general, it is difficult to deposit a metal uniformly inside a base such as the resin shaped body having a three-dimensional mesh-like structure. It is preferable to circulate the plating solution in order to reduce the area of the inner surface of the resin shaped body on which the plating solution is not deposited and the difference between the amounts of metal deposited on the inside and outside of the resin shaped body. The circulation of the plating solution can be made by, for example, using a pump or using a fan disposed inside the plating vessel. Spraying the plating solution onto the resin shaped body using the above methods and arranging the resin shaped body in the vicinity of a suction port advantageously facilitates the formation of a stream of the plating solution inside the resin shaped body.

—Resin Shaped Body-Removal Step—

In this step, the resin shaped body 4 is removed.

The method for removing the resin shaped body 4, which is used as a base, from the resin structure including the resin shaped body 4 and the primary metal layer 6 disposed on the surface of the resin skeleton is not limited; the removal of the resin shaped body 4 may be done by, for example, a chemical treatment or incineration. When the resin shaped body 4 is removed by incineration, for example, the resin structure is heated in an oxidizing atmosphere, such as air, at about 600° C. or more.

The resin shaped body-removal step is not necessarily conducted immediately after the primary metal layer-formation step and may be conducted subsequent to the powder layer-formation step, which is described below.

—Powder Layer-Formation Step—

In this step, the powder layer 7 is formed on the outer peripheral surface of the primary metal layer 6 prepared above (see FIG. 3).

The method for forming the powder layer is not limited but preferably any one of the methods (i) to (iii) below in which the first to third slurries are used as in the formation of the conductive layer described above.

(i) Application of First Slurry

The method (i) is a method for forming the powder layer 7, the method including:

a step in which the first slurry is applied onto the outer peripheral surface of the primary metal layer 6; and a step in which the first slurry deposited on the outer peripheral surface of the primary metal layer 6 is dried.

In the method (i), a power of chromium or chromium oxide is mixed with a nickel powder. This increases the likelihood of a chromium component derived from the power of chromium or chromium oxide being diffused into the primary metal layer 6 while a nickel component derived from the nickel powder is diffused into the primary metal layer 6 in the heat treatment step described below. In addition, a mixture of the nickel powder and the powder of chromium or a chromium oxide is sintered to form a microporous layer 2A in the heat-treatment step. This enhances the corrosion resistance of the outer peripheral surface of the skeleton of the porous metal body.

(ii) Application of Second and Third Slurries

The method (ii) is a method for forming the powder layer 7, the method including:

a step in which the second slurry is applied onto the outer peripheral surface of the primary metal layer 6;

a step in which the second slurry deposited on the outer peripheral surface of the primary metal layer 6 is dried;

a step in which the third slurry is applied onto the surface of the second slurry deposited on the outer peripheral surface of the primary metal layer 6; and a step in which the third slurry deposited on the surface of the second slurry is dried.

In the method (ii), the second slurry and the third slurry are applied onto the surface of the primary metal layer 6 in this order to form the powder layer 7. As a result, a layer containing the nickel powder and a layer containing the powder of chromium or a chromium oxide are formed in this order on the surface of the primary metal layer 6. In other words, the nickel powder is present in the vicinity of the primary metal layer 6. This increases the likelihood of the powder of chromium or a chromium oxide being diffused into the primary metal layer 6 while the nickel component derived from the nickel powder is diffused into the primary metal layer 6 in the heat treatment step described below. Furthermore, in the method (ii), a microporous layer that is a layer containing a large amount of powder of chromium or a chromium oxide is formed on the side far from the primary metal layer 6 (i.e., the topmost surface of the skeleton). This further enhances the corrosion resistance of the surface of the skeleton of the porous metal body that is to be formed finally.

The method (ii), in which the second slurry and the third slurry each contain only one metal, is a method suitable for the industrial continuous production of the porous metal body, because the slurries can be prepared without taking, for example, the specific gravities of the slurries into account.

(iii) Application of First and Second Slurries

The method (iii) is a method for forming the powder layer 7, the method including:

a step in which the first slurry is applied onto the outer peripheral surface of the primary metal layer 6;

a step in which the first slurry deposited on the outer peripheral surface of the primary metal layer 6 is dried;

a step in which the third slurry is applied onto the surface of the first slurry deposited on the outer peripheral surface of the primary metal layer 6; and a step in which the third slurry deposited on the surface of the first slurry is dried.

In the method (iii), the first slurry and the third slurry are applied onto the surface of the primary metal layer 6 in this order to form the powder layer 7. As a result, a layer containing the nickel powder and the powder of chromium or a chromium oxide and a layer containing the powder of chromium or a chromium oxide are formed in this order on the surface of the primary metal layer 6. Also in the method (iii), this increases the likelihood of the chromium component derived from the powder of chromium or a chromium oxide being diffused into the primary metal layer 6 while the nickel component derived from the nickel powder is diffused into the primary metal layer 6 in the heat treatment step described below. Furthermore, in the method (iii), a microporous layer that is a layer containing a large amount of powder of chromium or a chromium oxide is formed on the side far from the primary metal layer 6 (i.e., the topmost surface of the skeleton). This further enhances the corrosion resistance of the outer peripheral surface of the skeleton of the porous metal body that is to be formed finally.

The first to third slurries used in the methods described in (i) to (iii) above may be the same as the first to third slurries used for forming the conductive layer 5 on the surface of the resin skeleton of the resin shaped body 4. That is, preferable examples of the nickel powder, the powder of chromium or a chromium oxide, and the binder are the same as those described above.

—Heat Treatment Step—

In this step, the structure including the primary metal layer 6, the conductive layer 5 deposited on the inner peripheral surface of the primary metal layer 6, and the powder layer 7 deposited on the outer peripheral surface of the primary metal layer 6 is heated in a reducing atmosphere. Heating the structure causes sintering of the nickel powder and the powder of chromium or a chromium oxide included in the powder layer 7 and the conductive layer 5. Consequently, the first microporous layer 2A and the second microporous layer 2B are forming on the outer peripheral surface and the inner peripheral surface of the porous metal body, respectively, subsequent to the heat treatment step. The first microporous layer 2A and the second microporous layer 2B contain nickel and chromium and are firmly bonded to the primary metal layer 6 of the porous metal body. Part of nickel and chromium contained in the first microporous layer 2A and the second microporous layer 2B are diffused into the primary metal layer 6 of the porous metal body to form an alloy, and unreacted chromium powder particles or unreacted chromium oxide powder particles do not remain.

In the heat treatment step, the heat treatment may be performed in any reducing atmosphere, such as a hydrogen ($H_2$) atmosphere or an ammonia-modified hydrogen gas atmosphere. In the case where the metal powders included in the first to third slurries are a nickel powder and a chromium powder that have not been oxidized and the removal of resin is done by a chemical treatment without oxidizing any metal such as the metal contained in the primary metal layer, the heat treatment step may be conducted in an inert gas atmosphere, such as a nitrogen gas or an argon gas.

In the heat treatment step, the heat treatment may be performed at any temperature at which the nickel powder and the powder of chromium or a chromium oxide can be reduced and sintered, that is, for example, about 1000° C. or more and 1600° C. or less. Performing the heat treatment at 1000° C. or more causes sintering of the nickel powder and the powder of chromium or a chromium oxide. Performing the heat treatment at 1600° C. or less reduces the costs of the heat treatment. From the above viewpoints, the heat treatment temperature is more preferably 1050° C. or more and 1400° C. or less and is further preferably 1100° C. or more and 1300° C. or less.

In the heat treatment step, the heat treatment is performed for an amount of time required for sufficiently sintering the nickel powder and the powder of chromium or a chromium oxide, that is, for example, about 15 minutes or more and 2 hours or less. Performing the heat treatment for 15 minutes or more enables sufficient sintering of the nickel powder and the powder of chromium or a chromium oxide. Setting the heat treatment time to 2 hours or less enables the continuous production of the extra-long product as a result of shortening the heat treatment time. From the above viewpoints, the heat treatment time is more preferably 20 minutes or more and 1.5 hours or less and is further preferably 30 minutes or more and 1 hour or less.

In the method for producing a porous metal body according to an embodiment of the present invention, the amount of time during which the heat treatment is performed for forming the microporous layer containing nickel and chromium is shorter than the amount of time during which a heat treatment is performed for preparing the porous nickel-chromium alloy bodies (i.e., the amount of time required for sufficiently diffusing chromium) known in the related art. This enables the porous metal body to be produced in not a batch process but a continuous process. Specifically, the metal powders can be sintered while the structure is transported through a furnace.

—Thickness Adjustment Step—

In this step, the porous metal body is rolled to a thickness of 0.2 mm or more and 1.2 mm or less subsequent to the heat treatment step. Rolling of the porous metal body can be performed by, for example, using a roller-pressing machine or by flat-sheet pressing. Adjusting the thickness of the porous metal body increases the uniformity in the thickness of the porous metal body and reduces surface irregularities. Rolling the porous metal body reduces the porosity of the porous metal body.

In the case where the porous metal body is used as a gas diffusion layer of a fuel battery, the thickness of the porous metal body may be adjusted to be slightly larger than the thickness of the gas diffusion layer included in the fuel battery such that the thickness of the porous metal body is reduced to 0.2 mm or more and 1.2 mm or less as a result of the porous metal body becoming deformed by a pressure applied to the porous metal body when the porous metal body is attached to the fuel battery. In such a case, the thickness of the porous metal body may be adjusted to be slightly larger than the thickness of the gas diffusion layer included in the fuel battery by rolling the porous metal body by a slight degree. This further increases the adhesion between the MEA and the gas diffusion layer (porous metal body) included in the fuel battery.

In the above-described method for producing a porous metal body according to an embodiment of the present invention, the contents of chromium in the conductive layer and the powder layer are set such that the final content of chromium in the porous metal body is 20% by mass or more and 50% by mass or less.

<Method and Apparatus for Producing Hydrogen>

The porous metal body according to the above embodiment of the present invention can be suitably used, in addition to as a fuel battery, for producing hydrogen by electrolysis of water. The methods for producing hydrogen can be roughly classified into the following three groups: [1] hydrogen production method in which alkaline water is electrolyzed, [2] hydrogen production method in which a PEM is used, and [3] hydrogen production method in which an SOEC is used. The porous metal body may be used in any of the above methods.

The hydrogen production method [1] in which alkaline water is electrolyzed is a method in which an anode and a cathode are immersed in a strong alkaline aqueous solution and a voltage is applied between the anode and the cathode to electrolyze water. Using the porous metal body as an electrode increases the area of a portion of the electrode at which the electrode comes into contact with water and thereby increases the efficiency of electrolysis of water.

In the hydrogen production method in which alkaline water is electrolyzed, the size of pores formed in the porous metal body as viewed from overhead is preferably 100 μm or more and 5000 μm or less. Setting the size of pores of the porous metal body as viewed from overhead to 100 μm or more reduces the likelihood of the pores of the porous metal body becoming clogged with gas bubbles of hydrogen and oxygen generated by electrolysis and reducing the area of a portion of the electrode at which the electrode comes into contact with water.

Setting the size of pores of the porous metal body as viewed from overhead to 5000 μm or less increases the surface area of the electrode to a sufficient degree and thereby increases the efficiency of electrolysis of water. From the same viewpoints as above, the size of pores of the porous metal body as viewed from overhead is more preferably 400 μm or more and 4000 μm or less.

The thickness of the porous metal body and the metal content in the porous metal body may be set adequately in accordance with the size of the facility because an increase in the area of the electrode may cause warpage and the like. Plural porous metal bodies having different pore sizes may be used in combination in order to purge the gas bubbles from the pores while maintaining a certain surface area.

The hydrogen production method [2] in which a PEM is used is a method in which water is electrolyzed using a polymer electrolyte membrane. In this method, an anode and a cathode are disposed on the respective surfaces of a polymer electrolyte membrane and a voltage is applied between the electrodes while water is fed onto the anode side. Hydrogen ions generated as a result of electrolysis of water are migrated onto the cathode side through the polymer electrolyte membrane and collected in the form of hydrogen on the cathode side. The operating temperature is about 100° C. Although the above structure is similar to that of a PEFC, which produces electric power from hydrogen and oxygen and discharges water, the operation in this method is completely opposite to that of a PEFC. Since the anode side and the cathode side are completely separated from each other, highly pure hydrogen can be collected advantageously. Since the anode and the cathode need to be capable of passing water and a hydrogen gas therethrough, the electrodes need to be conductive porous bodies.

Since the porous metal body according to the above embodiment of the present invention has a high porosity and a good conductivity, the porous metal body can be suitably used also for electrolyzing water with a PEM as for PEFCs. In the hydrogen production method in which a PEM is used, the size of pores of the porous metal body as viewed from overhead is preferably 100 μm or more and 700 μm or less. Setting the size of pores of the porous metal body as viewed from overhead to 100 μm or more reduces the likelihood of the pores of the porous metal body becoming clogged with gas bubbles of hydrogen and oxygen generated by electrolysis and reducing the area of a portion of the polymer electrolyte membrane at which the polymer electrolyte membrane comes into contact with water. Setting the size of pores of the porous metal body as viewed from overhead to 700 μm or less enables the porous metal body to have a sufficient water holding capacity and reduces the likelihood of water passing through the porous metal body without reacting. This increases the efficiency of electrolysis of water. From the same viewpoints as above, the size of pores of the porous metal body as viewed from overhead is more preferably 150 μm or more and 650 μm or less and is further preferably 200 μm or more and 600 μm or less.

Although the thickness of the porous metal body and the metal content in the porous metal body may be set adequately in accordance with the size of the facility, they are preferably adjusted such that the porosity of the porous metal body is 30% or more because a large pressure loss occurs when water is passed through a porous metal body having an excessively small porosity. In the hydrogen production method in which a PEM is used, a polymer electrolyte membrane and electrodes are communicated with one another by pressure bonding. Accordingly, the metal content in the porous metal body needs to be adjusted such that an increase in electric resistance which is caused by the deformation or creep of the porous metal body during pressurization is negligible in practical use. The metal content in the porous metal body is preferably about 200 $g/m^2$ or more and 1200 $g/m^2$ or less, is more preferably about 300 $g/m^2$ or more and 1100 $g/m^2$ or less, and is further preferably about 400 $g/m^2$ or more and 1000 $g/m^2$ or less. Plural porous metal bodies having different pore sizes may be used in combination in order to maintain a certain porosity and good electrical connection.

The hydrogen production method [3] in which an SOEC is used is a method in which water is electrolyzed using a solid oxide electrolyte membrane. The structure of the electrolyzer depends on whether the electrolyte membrane is a proton-conducting membrane or an oxygen ion-conducting membrane. In the case where an oxygen ion-conducting membrane is used, hydrogen is generated on the cathode side on which water vapor is fed, which may reduce the purity of hydrogen. Accordingly, it is preferable to use a proton-conducting membrane from the viewpoint of hydrogen production.

In this method, an anode and a cathode are disposed on the respective sides of a proton-conducting membrane and a voltage is applied between the electrodes while water vapor is fed onto the anode side. Hydrogen ions generated as a result of electrolysis of water are migrated onto the cathode side through the solid oxide electrolyte membrane and only hydrogen is collected on the cathode side. The operating temperature is about 600° C. to 800° C. Although the above structure is similar to that of a solid oxide fuel cell, which produces electric power from hydrogen and oxygen and discharges water, the operation in this method is completely opposite to that of a solid oxide fuel cell.

Since the anode and the cathode need to be capable of passing water vapor and a hydrogen gas therethrough, the electrodes need to be conductive porous bodies that are, in particular, capable of withstanding a high-temperature oxidizing atmosphere when used on the anode side. Since the porous metal body according to the above embodiment of the present invention has a high porosity, a good conductivity, and high resistance to oxidation and heat, the porous metal body can be suitably used also for electrolyzing water using an SOEC as for solid oxide fuel cells. It is preferable to use an electrode composed of a Ni alloy containing a metal having high oxidation resistance, such as Cr, on the oxidizing-atmosphere side.

In the method for producing hydrogen in which an SOEC is used, the size of pores of the porous metal body as viewed from overhead is preferably 100 μm or more and 700 μm or less. Setting the size of pores of the porous metal body as viewed from overhead to 100 μm or more reduces the likelihood of the pores of the porous metal body becoming clogged with water vapor or hydrogen generated by electrolysis and reducing the area of a portion of the solid oxide electrolyte membrane at which the solid oxide electrolyte membrane comes into contact with water vapor. Setting the size of pores of the porous metal body as viewed from overhead to 700 μm or less limits an excessive reduction in the pressure loss and reduces the likelihood of water vapor passing through the porous metal body without reacting sufficiently. From the same viewpoints as above, the size of pores of the porous metal body as viewed from overhead is more preferably 150 μm or more and 650 μm or less and is further preferably 200 pin or more and 600 μm or less.

Although the thickness of the porous metal body and the metal content in the porous metal body may be set adequately in accordance with the size of the facility, they are preferably adjusted such that the porosity of the porous metal body is 30% or more because a large pressure loss occurs when water vapor is passed through a porous metal body having an excessively small porosity. In the hydrogen production method in which an SOEC is used, a solid oxide electrolyte membrane and electrodes are communicated with one another by pressure bonding. Accordingly, the metal content in the porous metal body needs to be adjusted such that an increase in electric resistance which is caused by the deformation or creep of the porous metal body during pressurization is negligible in practical use. The metal content in the porous metal body is preferably about 200 $g/m^2$ or more and 1200 $g/m^2$ or less, is more preferably about 300 $g/m^2$ or more and 1100 $g/m^2$ or less, and is further preferably about 400 $g/m^2$ or more and 1000 $g/m^2$ or less. Plural porous metal bodies having different pore sizes may be used in combination in order to maintain a certain porosity and good electrical connection.

<Appendices>

The foregoing description covers the features described below.

(Appendix 1)

A method for producing hydrogen, the method including electrolyzing water by using a porous metal body as an electrode, the porous metal body being a porous metal body including a skeleton having a three-dimensional mesh-like structure, the porous metal body having a plate-like overall shape, the skeleton having a hollow structure, the skeleton including a primary metal layer and at least one of a first microporous layer and a second microporous layer, the primary metal layer being composed of nickel or a nickel alloy, the first microporous layer containing nickel and chromium, the first microporous layer being disposed on an outer peripheral surface of the primary metal layer, the second microporous layer containing nickel and chromium, the second microporous layer being disposed on an inner peripheral surface of the primary metal layer, the inner peripheral surface facing a hollow space of the skeleton.

(Appendix 2)

The method for producing hydrogen described in Appendix 1, wherein the skeleton includes the primary metal layer, the first microporous layer, and the second microporous layer.

(Appendix 3)

The method for producing hydrogen described in Appendix 1 or 2, wherein the content of chromium in the porous metal body is 20% by mass or more and 50% by mass or less.

(Appendix 4)

The method for producing hydrogen described in any one of Appendices 1 to 3, wherein the overall shape of the porous metal body has a thickness of 0.2 mm or more and 1.2 mm or less.

(Appendix 5)

The method for producing hydrogen described in any one of Appendices 1 to 4, wherein the porous metal body has a porosity of 51% or more and 90% or less and a metal-coating weight of 200 $g/m^2$ or more and 1200 $g/m^2$ or less.

(Appendix 6)

The method for producing hydrogen described in any one of Appendices 1 to 5, wherein the water is a strong-alkaline aqueous solution.

(Appendix 7)

The method for producing hydrogen described in any one of Appendices 1 to 5, wherein a pair of the porous metal bodies are disposed on the respective sides of a polymer electrolyte membrane so as to come into contact with the polymer electrolyte membrane, the pair of the porous metal bodies serving as an anode and a cathode, and water is fed onto the anode side and electrolyzed to produce hydrogen on the cathode side.

(Appendix 8)

The method for producing hydrogen described in any one of Appendices 1 to 5, wherein a pair of the porous metal bodies are disposed on the respective sides of a solid oxide electrolyte membrane so as to come into contact with the solid oxide electrolyte membrane, the pair of the porous metal bodies serving as an anode and a cathode, and water vapor is fed onto the anode side and electrolyzed to produce hydrogen on the cathode side.

(Appendix 9)

An apparatus for producing hydrogen, the apparatus being capable of generating hydrogen by electrolyzing water, the apparatus including a porous metal body serving as an electrode, the porous metal body being a porous metal body including a skeleton having a three-dimensional mesh-like structure, the porous metal body having a plate-like overall shape, the skeleton having a hollow structure, the skeleton including a primary metal layer and at least one of a first microporous layer and a second microporous layer, the primary metal layer being composed of nickel or a nickel alloy, the first microporous layer containing nickel and chromium, the first microporous layer being disposed on an outer peripheral surface of the primary metal layer, the second microporous layer containing nickel and chromium, the second microporous layer being disposed on an inner peripheral surface of the primary metal layer, the inner peripheral surface facing a hollow space of the skeleton.

(Appendix 10)

The apparatus for producing hydrogen described in Appendix 9, wherein the skeleton includes the primary metal layer, the first microporous layer, and the second microporous layer.

(Appendix 11)

The apparatus for producing hydrogen described in Appendix 9 or 10, wherein the content of chromium in the porous metal body is 20% by mass or more and 50% by mass or less.

(Appendix 12)

The apparatus for producing hydrogen described in any one of Appendices 9 to 11 wherein the overall shape of the porous metal body has a thickness of 0.2 mm or more and 1.2 mm or less.

(Appendix 13)

The apparatus for producing hydrogen described in any one of Appendices 9 to 12, wherein the porous metal body has a porosity of 51% or more and 90% or less and a metal-coating weight of 200 $g/m^2$ or more and 1200 $g/m^2$ or less.

(Appendix 14)

The apparatus for producing hydrogen described in any one of Appendices 9 to 13, wherein the water is a strong-alkaline aqueous solution.

(Appendix 15)

The apparatus for producing hydrogen described in any one of Appendices 9 to 13, the apparatus including a polymer electrolyte membrane, and an anode and a cathode that are disposed on the respective sides of the polymer electrolyte membrane, the anode and the cathode being in contact with the polymer electrolyte membrane, the apparatus being capable of generating hydrogen on the cathode side by electrolyzing water fed onto the anode side, at least one of the anode and the cathode being the porous metal body.

(Appendix 16)

The apparatus for producing hydrogen described in any one of Appendices 9 to 13, the apparatus including a solid oxide electrolyte membrane, and an anode and a cathode that are disposed on the respective sides of the solid oxide electrolyte membrane, the anode and the cathode being in contact with the solid oxide electrolyte membrane, the apparatus being capable of generating hydrogen on the cathode side by electrolyzing water vapor fed onto the anode side, at least one of the anode and the cathode being the porous metal body.

EXAMPLES

The present invention is described in further detail on the basis of the examples below. The following examples are illustrative, and the porous metal body, etc. according to the present invention are not limited by the examples. The scope of the present invention is deteiinined by the appended claims and includes all variations of the equivalent meanings and ranges to the claims.

Example 1

—Preparation of Porous Metal Body—

(Conductive Layer-Formation Step)

A sheet composed of urethane resin foam having a porosity of 95%, a pore size of 650 pin, and a thickness of 1.3 mm was used as a resin shaped body having a three-dimensional mesh-like structure. The urethane resin foam was immersed in a solution prepared by dispersing 200 g of a carbon powder having a particle size of 0.01 to $20_1$-1111 in 800 g of a 10-mass % acryl-styrene copolymer emulsion. After the urethane resin foam had been removed from the solution, it was passed between rollers in order to remove excess slurry. The urethane resin foam was subsequently dried. Thus, the surface of the skeleton of the urethane resin foam was made conductive.

(Primary Metal Layer-Formation Step)

The conductive urethane resin foam was electroplated with nickel by a publicly known method in which a sulfamic acid bath is used. Nickel electroplating was performed at a current density of 250 mA/cm$^2$ with a bath having a publicly known composition, that is, a composition primarily containing 430 g/L of nickel sulfamate, 7 g/L of nickel chloride, and 32 g/L of boric acid. Hereby, a resin structure including the resin shaped body and a nickel-coating layer deposited on the surface of the resin skeleton of the resin shaped body was formed.

(Removal of Resin Shaped Body)

The resin structure was heated at 750° C. in air in order to remove the resin shaped body by incineration. Subsequently, heating was performed at 850° C. for 10 minutes in a hydrogen atmosphere in order to reduce partially oxidized nickel and to perform annealing.

Hereby, a porous nickel body having a three-dimensional mesh-like structure was formed. The porous nickel body had a thickness of 1.3 mm and a nickel-coating weight of 550 g/cm$^2$.

(Powder Layer-Formation Step)

((First Slurry))

A chromium trioxide powder having an average particle size of 1 μm and a carbonyl nickel powder having an average particle size of 3 μm were mixed with each other at a weight ratio of 7:3 to form a mixed powder. The apparent density of the mixed powder was adjusted to be 0.65 mg/cm$^3$. Conversely, the volume ratio between the chromium trioxide powder and the carbonyl nickel powder in the mixed powder was substantially 3:7. Particles of the chromium trioxide powder were surrounded by particles of the carbonyl nickel powder.

An aqueous polyethylene emulsion, which served as a binder, was added to the mixed powder at a concentration of 6% by mass. Subsequently, carboxymethyl cellulose, which served as a thickener, was added to the mixed powder at a concentration of 0.4% by mass. Hereby, a first slurry was prepared.

The porous nickel body was immersed in the first slurry in order to deposit the slurry on the surface of the skeleton. Subsequently, drying was performed at 110° C. This caused fusion of polyethylene and, as a result, a layer composed of a mixture of the chromium trioxide powder and the carbonyl nickel powder was firmly deposited on the surface of the skeleton.

(Heat Treatment Step)

The porous nickel body including the powder layer deposited thereon was heated at 1100° C. for 60 minutes in a hydrogen gas atmosphere in order to diffuse nickel and chromium into the porous nickel body. Hereby, a porous metal body including a microporous layer containing nickel and chromium which was disposed on the surface of the skeleton was prepared.

The porous metal body had an alloy composition such that the weight ratio between nickel and chromium was 75:25. The thickness of the porous metal body was reduced to 0.5 mm by roller pressing. The porous metal body had a porosity of 83%.

Preparation of Fuel Battery

The porous metal body prepared above was used as a gas diffusion layer and a gas feed-discharge channel included in a PEFC (electric cell).

An electric cell was assembled using the porous metal body and a commercial MEA. The porous metal body was cut into a 5 cm×5 cm piece. An electric cell illustrated in FIG. 2 was prepared. Specifically, the MEA was interposed between a pair of carbon paper sheets. A pair of the porous metal bodies were disposed on the respective outer surfaces of the carbon paper sheets to form an electric cell. A gasket and concave graphite plates were used in order to prevent leakage at the air electrode and the hydrogen electrode. The periphery of the electric cell was fixed by being tightened using bolts and nuts in order to enhance the contact between the components of the electric cell and to prevent the leakage of hydrogen or air from the cell. While the thickness of the graphite plates used as a separator is commonly about 1 to 2 mm because the electric cell is used for producing a laminated battery in practical use, the thickness of the graphite plates used in this example was set to 10 mm in order to maintain a strength high enough to withstand tightening. Hereinafter, this cell is referred to as "battery A".

Example 2

—Preparation of Porous Metal Body—

A porous nickel body was prepared as in Example 1, except that a sheet composed of urethane resin foam having a porosity of 90%, a pore size of 450 µm, and a thickness of 1.0 mm was used and the nickel-coating weight of the porous metal body was changed to 400 g/cm$^2$.

(Powder Layer-Formation Step)

((Second Slurry))

A carbonyl nickel powder was prepared. The average particle size of the carbonyl nickel powder had been adjusted to be 3 µm. The apparent density of the carbonyl nickel powder had been adjusted to be 0.75 mg/cm$^3$. An aqueous polyethylene emulsion, which served as a binder, was added to the carbonyl nickel powder at a concentration of 5% by mass. Subsequently, carboxymethyl cellulose, which served as a thickener, was added to the resulting mixture at a concentration of 0.4% by mass. Hereby, a second slurry was prepared.

The porous nickel body was immersed in the second slurry in order to deposit the slurry on the surface of the skeleton. Subsequently, drying was performed at 110° C. This caused fusion of polyethylene and, as a result, a layer containing the carbonyl nickel powder was firmly deposited on the surface of the skeleton.

((Third Slurry))

An aqueous polyethylene emulsion, which served as a binder, was added to a chromium trioxide powder having an average particle size of 1 µm at a concentration of 5% by mass. Subsequently, carboxymethyl cellulose, which served as a thickener, was added to the resulting mixture at a concentration of 0.6% by mass. Hereby, a third slurry was prepared.

The porous nickel body including the layer containing the carbonyl nickel powder which was deposited on the surface of the skeleton was immersed in the third slurry in order to deposit the third slurry on the surface of the skeleton. Subsequently, drying was performed at 110° C. This caused fusion of polyethylene and, as a result, a layer containing the chromium trioxide powder was firmly deposited on the surface of the skeleton.

Through the above steps, a layer containing a nickel powder was formed on the surface of the skeleton of the porous nickel body, and a layer containing a chromium oxide powder was formed on the layer containing a nickel powder.

(Heat Treatment Step)

The porous nickel body including the powder layer deposited thereon was heated at 1100° C. for 60 minutes in a hydrogen gas atmosphere in order to diffuse nickel and chromium into the porous nickel body. Hereby, a porous metal body including a microporous layer containing nickel and chromium which was disposed on the surface of the skeleton was prepared.

The porous metal body had an alloy composition such that the weight ratio between nickel and chromium was 70:30. The thickness of the porous metal body was reduced to 0.5 mm by roller pressing. The porous metal body had a porosity of 86.5%.

—Preparation of Fuel Battery—

An electric cell of a fuel battery was prepared as in Example 1, except that the porous metal body prepared above was used. Hereinafter, this electric cell is referred to as "battery B".

Example 3

—Preparation of Porous Metal Body—

A sheet composed of urethane resin foam having a porosity of 95%, a pore size of 500 µm, and a thickness of 1.2 mm was used as a resin shaped body having a three-dimensional mesh-like structure. The urethane resin foam was subjected to an electrical conduction treatment in which the first slurry was used instead of a carbon paint.

The conductive urethane resin foam was plated with nickel at a nickel-coating weight of 550 g/m$^2$ in order to form a primary metal layer. Subsequently, a heat treatment was performed in air at 850° C. in order to remove the resin component. Then, heating was performed at 1100° C. for 30 minutes in a hydrogen atmosphere in order to reduce an oxidized metal component and to diffuse nickel and chromium into the primary metal layer. Hereby, a porous metal body including a microporous layer containing nickel and chromium which was disposed on the inner peripheral surface of the primary metal layer was prepared.

The porous metal body had an alloy composition such that the weight ratio between nickel and chromium was 80:20. The thickness of the porous metal body was reduced to 0.3 mm by roller pressing. The porous metal body had a porosity of 72% after the thickness of the porous metal body had been adjusted.

—Preparation of Fuel Battery—

An electric cell of a fuel battery was prepared as in Example 1, except that the porous metal body prepared above was used after the thickness of the porous metal body had been adjusted. Hereinafter, this electric cell is referred to as "battery C".

Example 4

—Preparation of Porous Metal Body—

A sheet composed of urethane resin foam having a porosity of 95%, a pore size of 500 µm, and a thickness of 1.3 mm was used as a resin shaped body having a three-dimensional mesh-like structure. The urethane resin foam was subjected to an electrical conduction treatment in which the third slurry and the second slurry were used in this order instead of a carbon paint.

The conductive urethane resin foam was plated with nickel at a nickel-coating weight of 550 g/m$^2$ in order to form a primary metal layer. The second slurry and the third slurry were applied onto the outer peripheral surface of the primary metal layer in this order to form a powder layer. Subsequently, a heat treatment was performed in air at 850° C. in order to remove the resin component. Then, heating was performed at 1100° C. for 30 minutes in a hydrogen atmosphere in order to reduce an oxidized metal component and to diffuse nickel and chromium into the primary metal layer. Hereby, a porous metal body including a microporous layer containing nickel and chromium which was disposed on the outer and inner peripheral surfaces of the primary metal layer was prepared.

The porous metal body had an alloy composition such that the weight ratio between nickel and chromium was 80:20. The thickness of the porous metal body was reduced to 0.3 mm by roller pressing. The porous metal body had a porosity of 72% after the thickness of the porous metal body had been adjusted.

—Preparation of Fuel Battery—

An electric cell of a fuel battery was prepared as in Example 1, except that the porous metal body prepared above was used. Hereinafter, this electric cell is referred to as "battery D".

Comparative Example 1

An electric cell was prepared using, as a gas diffusion layer, a general-purpose separator (graphite plate) having grooves formed therein. Specifically, the MEA and the carbon paper that are the same as those used in the preparation of the battery A were used for an anode and a cathode. The depth and width of the grooves were 1 mm. The distance between a pair of adjacent grooves was 1 mm. Therefore, the apparent porosity of the gas diffusion layer was substantially 50%. Hereinafter, this cell is referred to as "battery R".

Comparative Example 2

An electric cell of a fuel battery was prepared as in Example 1, except that the porous nickel body (in which a microporous layer had not yet been formed) prepared in Example 1 was used as a gas diffusion layer. Hereinafter, this electric cell is referred to as "battery S".

[Evaluations]
—Discharging Characteristic—

The change in the discharging characteristic of each of the batteries A to D and the batteries R and S which was caused by repeated cycles of discharging and idling of the battery was determined. The discharging characteristic of each of the batteries A to D and the batteries R and S was determined while hydrogen was fed to the anode and air was fed to the cathode.

The gases were fed to the respective electrodes with an apparatus capable of making adjustment in accordance with the load. The periphery temperature of the electrodes was set to 25° C. The operating temperature was set to 80° C.

Figure 4:
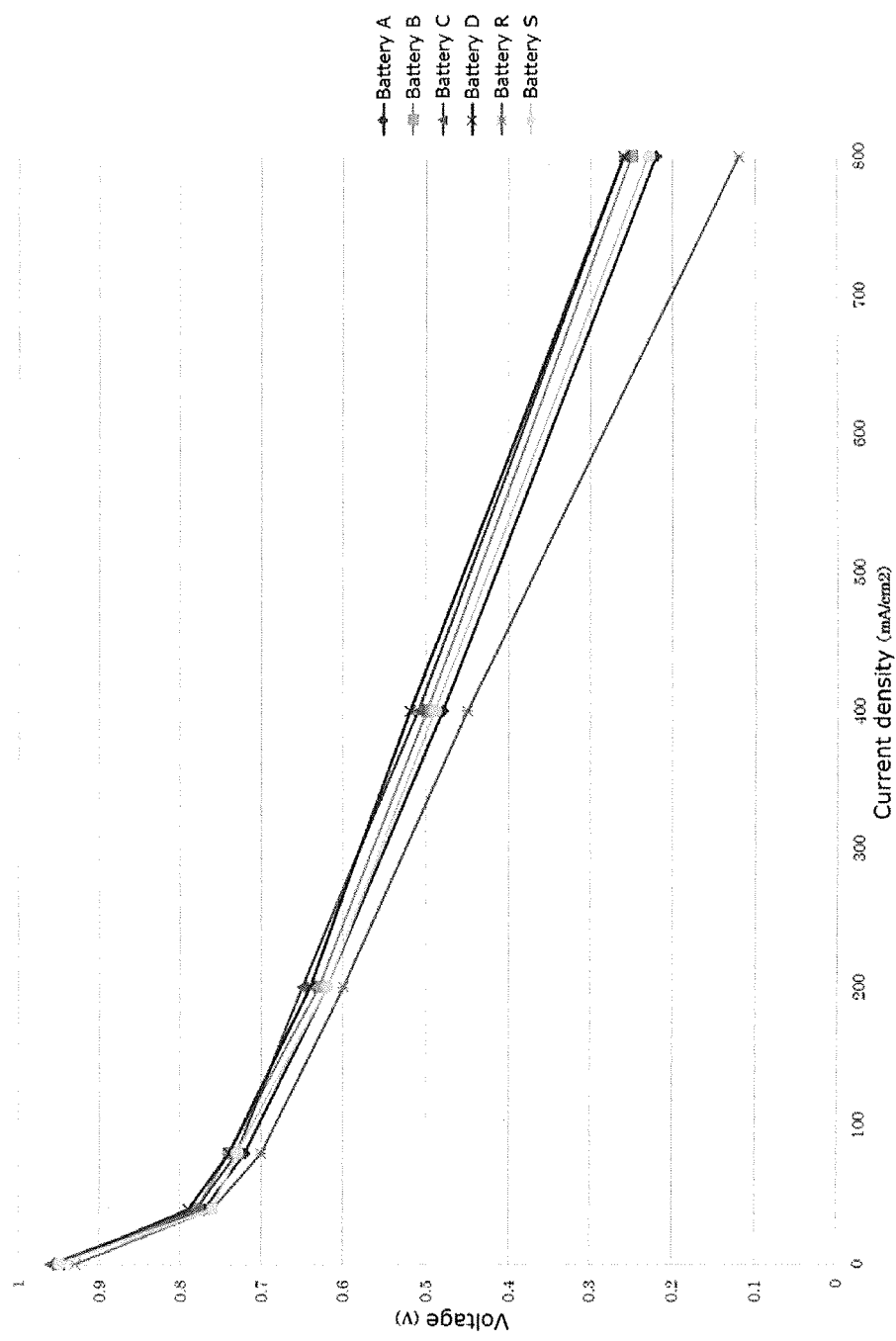
FIG. 4 is a graph illustrating the relationship between the discharge current density of each of the batteries A to D, R, and S prepared in Examples and the voltage of the battery.

Table 1 shows the relationship between the discharge current density of each of the batteries A to D and the batteries R and S and the voltage of the battery. FIG. 4 illustrates the data shown in Table 1 in the form of a graph. In FIG. 4, the vertical axis denotes voltage (V) and the horizontal axis denotes current density (mA/cm$^2$). The voltages of the batteries A to D and S were slightly higher than the voltage of the battery R and were particularly high when the discharge current density was high, that is, 400 mA/cm$^2$ or more. This is presumably because the gas diffusion layers included in the batteries A to D and S, which were the porous metal bodies, had a higher conductivity and higher gas diffusibility than the gas diffusion layer of the battery R. Specifically, the porous metal bodies used as the gas diffusion layers included in the batteries A to D and S were about two orders of magnitude better than graphite included in the battery R. In addition, the gas diffusion layers of the batteries A to D and S had a high porosity, that is, 70% or more. This facilitates feeding of hydrogen and air to the respective gas diffusion electrodes and, in particular, dissipation of air and removal of product water after discharge.

TABLE 1

|  |  | Current density (mA/cm$^2$) | | | | | |
| --- | --- | --- | --- | --- | --- | --- | --- |
|  |  | 0 | 40 | 80 | 200 | 400 | 800 |
| Voltage (V) | Battery A | 0.95 | 0.77 | 0.72 | 0.62 | 0.48 | 0.22 |
|  | Battery B | 0.95 | 0.78 | 0.74 | 0.63 | 0.50 | 0.25 |
|  | Battery C | 0.96 | 0.78 | 0.73 | 0.65 | 0.51 | 0.26 |
|  | Battery D | 0.95 | 0.79 | 0.74 | 0.64 | 0.52 | 0.26 |
|  | Battery R | 0.93 | 0.76 | 0.70 | 0.60 | 0.45 | 0.12 |
|  | Battery S | 0.95 | 0.76 | 0.73 | 0.62 | 0.49 | 0.23 |

The change in the discharging characteristic of each battery which was caused by repeated cycles of discharging and idling of the battery is described below. In this test, a comparison was made between the batteries A, D, R, and S.

Each of the batteries was discharged with a constant discharge current density of 300 mA/cm$^2$ at 85° C. for 1000 hours. Subsequently, feeding of hydrogen and air was stopped, and the temperature of the battery was reduced to room temperature. After the battery had been left to stand for 100 hours, the battery was reheated and discharged with the constant current under the same conditions as above. The above operation is considered to be one cycle. The change in the discharge potential of each of the batteries which was discharged at 300 mA/cm$^2$ with the number of cycles was determined.

Figure 5:
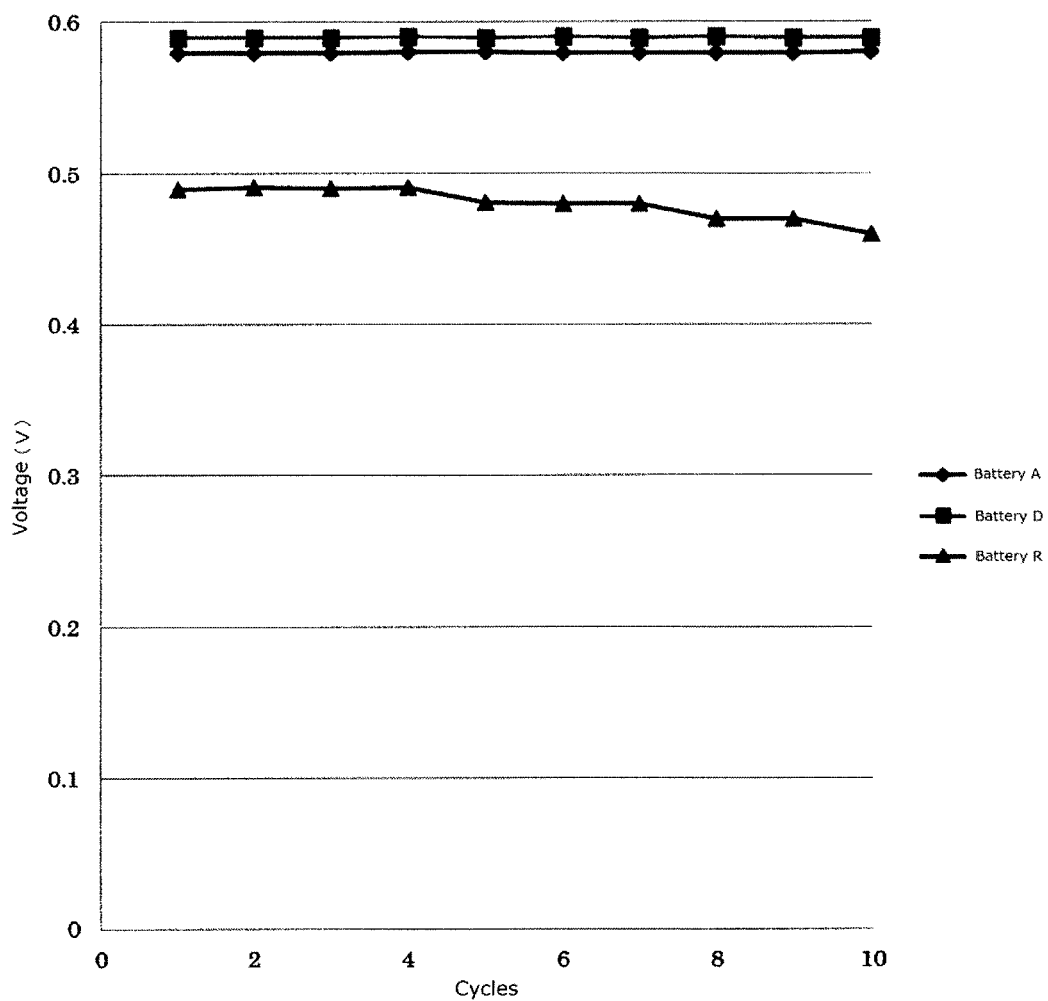
FIG. 5 is a graph illustrating a change in the discharge potential of each of the batteries A, D, and R prepared in Examples.

FIG. 5 illustrates the results. In FIG. 5, the vertical axis denotes voltage (V), and the horizontal axis denotes the number of cycles (times). As illustrated in FIG. 5, the discharge potentials of the batteries A and D did not decrease even after 10 cycles, that is, after the batteries had been discharged for 10,000 hours in total, and maintained to be the initial voltages. In contrast, the discharge potential of the battery R decreased to 0.47 V, while the initial voltage of the battery R was 0.49 V. This is presumably because the protrusions of grooves formed in the separator of the battery R became inserted into the carbon paper sheet, which reduced the uniformities in feeding of the gas and discharging of air from the cathode. The test of the battery S was stopped because the discharge potential of the battery S started to rapidly decrease after three cycles.

REFERENCE SIGNS LIST

M MEMBRANE-ELECTRODE ASSEMBLY (MEA)
1 PRIMARY METAL LAYER
2A FIRST MICROPOROUS LAYER
2B SECOND MICROPOROUS LAYER
3 HOLLOW PORTION
4 RESIN SHAPED BODY
5 CONDUCTIVE LAYER
6 PRIMARY METAL LAYER
7 POWDER LAYER
1-1 ION-EXCHANGE MEMBRANE
2-1 GAS DIFFUSION ELECTRODE (ACTIVE CARBON LAYER CONTAINING PLATINUM CATALYST)
2-2 GAS DIFFUSION ELECTRODE (ACTIVE CARBON LAYER CONTAINING PLATINUM CATALYST)
3-1 CURRENT COLLECTOR
3-2 CURRENT COLLECTOR
4-1 SEPARATOR
4-1-1 GAS DIFFUSION LAYER
4-2 SEPARATOR
4-2-1 GAS DIFFUSION LAYER

The invention claimed is:
1. A porous metal body including a skeleton having a three-dimensional mesh-like structure, the porous metal body having a plate-like overall shape,
   the skeleton having a hollow structure, the skeleton comprising a primary metal layer a first microporous layer and a second microporous layer,
   the primary metal layer being composed of nickel or a nickel alloy,
   the first microporous layer containing nickel and chromium, the first microporous layer being disposed on an outer peripheral surface of the primary metal layer,
   the second microporous layer containing nickel and chromium, the second microporous layer being disposed on an inner peripheral surface of the primary metal layer, the inner peripheral surface facing a hollow space of the skeleton.

2. The porous metal body according to claim 1, wherein the content of chromium in the porous metal body is 20% by mass or more and 50% by mass or less.

3. The porous metal body according to claim 1, wherein the overall shape of the porous metal body has a thickness of 0.2 mm or more and 1.2 mm or less.

4. The porous metal body according to claim 1, wherein the porous metal body has a porosity of 51% or more and 90% or less and a metal-coating weight of 200 $g/m^2$ or more and 1200 $g/m^2$ or less.

* * * * *